Patented Feb. 11, 1941

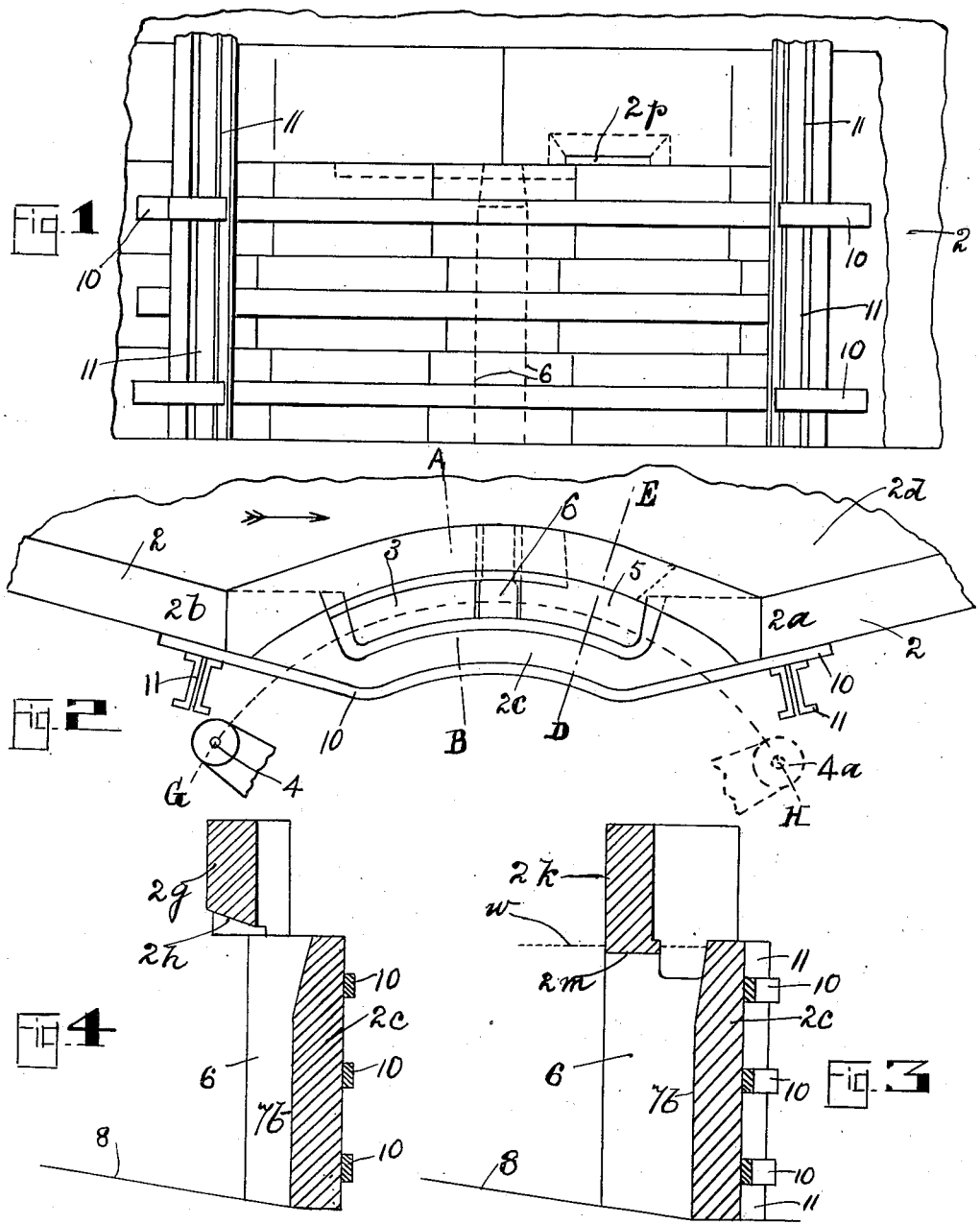

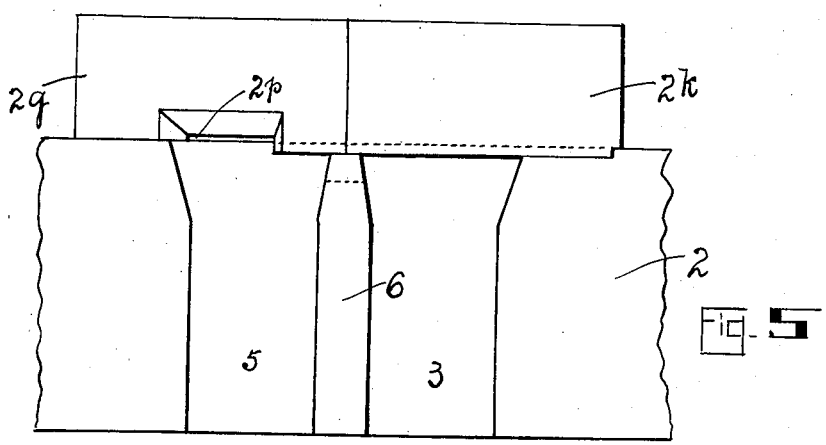
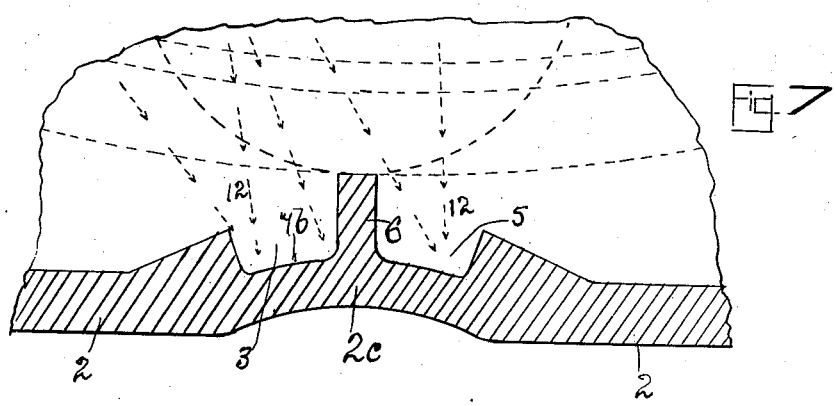
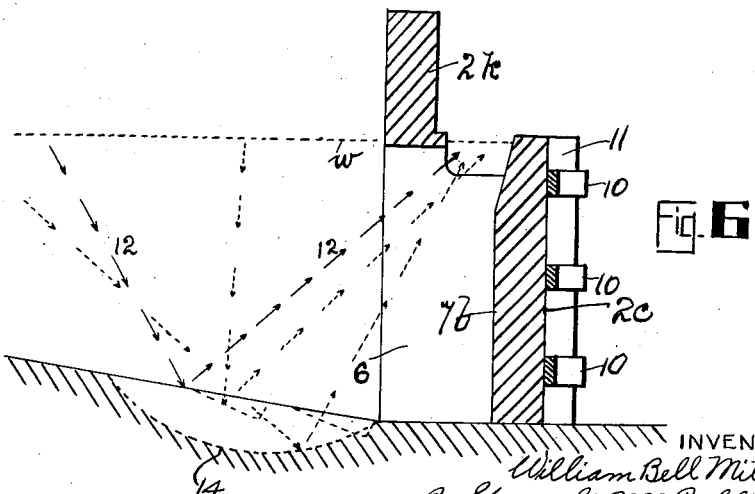

2,231,770

UNITED STATES PATENT OFFICE 2,231,770

FURNACE FOR USE IN CONNECTION WITH MACHINES FOR THE MANUFACTURE OF ARTICLES OF GLASS

William Bell Mitchell, Bradford, England

Application June 30, 1937, Serial No. 151,072
In Great Britain November 21, 1936

8 Claims. (Cl. 49—56)

This invention relates to furnaces for use in connection with machines for the manufacture of articles of glass whereby said machines are enabled, during their continuously revolving motions adjacent to the said glass furnaces, to gather or take-up molten glass to form a bottle or other article without interruption of the motion of the machine, somewhat in a manner as has been already proposed to be followed.

However, according to my present invention, I now form the gathering space or pool within the walls of the furnace in such a manner as to avoid removing the molten glass from the bulk or volume of same within the furnace in order to deprive that part or portion of such glass which enters within the gathering pool (forming a part of the body of the furnace) of its fluidity, while I also provide means whereby any moil or cooled portion of glass that is cut away or removed from the glass-gathering members to be so conveyed back into the body or volume of molten glass within the furnace may be there reheated or brought back to its desired fluidity and other conditions which prevent same from causing defects in the resultant bottle such as had been heretofore encountered.

In carrying out my invention I make use of a furnace provided with the new formation of a furnace provided with the new formation of ingress and adjacent formations appertaining thereto hereinafter described, so that a rotary machine may revolve in its circular path contiguous to the furnace, and certain parts of same will overhang my improved formed part of said furnace in the manner and for the purpose hereinafter fully described.

In describing my invention I hereinafter refer to the sheets of drawings hereunto annexed, which show the new formation I employ, and in which:

Fig. 1 is a view of a portion of the outside wall of a furnace where my improved formation occurs.

Fig. 2 is a plan of the parts shown by Fig. 1.

Fig. 3 is a sectional elevation taken on lines AB of Fig. 2 and as seen in the direction indicated by the arrow associated with Fig. 2.

Fig. 4 is a sectional elevation of Fig. 2 taken on line D—E and as seen in the direction opposite to that indicated by the arrow of Fig. 2.

Fig. 5 is a view of the structure shown by Fig. 2 as seen in the direction looking from left to right of said figure.

Figs. 6 and 7 are elevation and plan respectively of the fractions of the wall and floor of the furnace to illustrate how the latter directs the rays of heat to act upon the molten glass as hereinafter explained.

Portions of the ordinary wall of the furnace's structure are indicated by the numeral 2, while the part between the points 2a and 2b of said wall (Fig. 2) is of the formation or construction shown by the drawings, and is fully hereinafter described.

In carrying out my invention I now form the gathering pool 3 within the portion of wall 2c (which is narrower at the part shown by the drawings than is the other part of the wall 2) so that said pool 3 is joined to and not in any way removed from the body of the molten glass or metal 2d within the furnace. Consequently, the portion of molten glass which flows from the body 2d into the pool 3 is not deprived of its heat to any extent which will detract detrimentally from its fluidity as compared with the fluidity of the body of the metal. Further, I also provide means whereby any moil or cooled portions of glass that is or are cut away or removed from the glass-gathering member 4 is or are allowed free access to the body or volume of molten glass within the furnace (which is filled with the molten glass from the furnace 2d in the same manner as is the space 3 hereinbefore referred to) where again such cut-off parts are re-heated so that they cannot leave their space in the solid or semi-solid form but must be re-melted to become amalgamated with the other molten glass.

This liquifying and flowing of the molten glass from the space 5 to mix with the interior molten metal 2d of the furnace is further constrained so to do in order to be prevented from ascending or flowing in such a direction as would enable it to flow around the partition 6 which I form between the portions 3 and 5 of the furnace as shown by the drawings.

The gathering pool 3 is in the form of a short arc of a circle which lies parallel with the arc of the circle that the feed taking-up member 4 of the machine follows in its circular path according to the rotations of said machine in well known manner.

The outer surface 2c of the portion of the furnace's wall 2 lies in a position as to permit the supports of the revolving machine which carry the gathering member 4 freely to travel in the arc of a circle, the path of the gathering member being shown by the line G—H in the arc of a circle the centre of which is the centre of rotation of the machine, in order that the central part of the member 4a may pass through the central part of the pool 3 as well as the central part of the pool 5 as will be understood.

The surface of the outer wall 2c forming the pools 3 and 5 may extend beyond the ordinary wall 2 of the furnace but is curved to allow the passage of the supporting parts of the machine as is above described, while the inner surface of the wall at 7b is made to reach perpendicularly to the base 8 of the furnace so that the molten glass within the furnace may freely flow against said portion of the wall and within the pools 3 and 5.

The partition 6 which divides the pool 3 from the pool 5 reaches to the upper surface of the wall 2 so that a monolith or moulded portion or fire-clay block 2g may extend from the central support 6 to the wall 2 as shown by Fig. 5 in order that the lower edge of said block 2g may have a tapering portion 2h forming a recess in said monolith or block 2g to allow or form a passage over the top of the glass w for the purpose hereinafter described, while another monolith 2k extends from the end of the wall 2 also to the central pillar or partition 6 in order that its inner lower edge 2m may lie below the upper level or surface w of the glass 2d for the purpose hereinafter described.

As the gathering member of the machine 4 carries its central part 4a along the path shown in broken lines G—H, when it reaches the pool 3 it descends therein and commences to gather up the glass from the furnace 2d through the open surface of the pool 3, and on reaching the central pillar or partition 6 said gathering member travels through the passage over the top of said member from which it moves forward above and over the top of the glass w in the pool 5.

When the gathering member is moving over the top of the pool 5 the moil or superfluous glass that is gathered at the nozzle of said member 4 is cut off and therefore descends down into the pool 5, and in order to assist said glass thus to descend the heating flame of the furnace passes through the opening 2p to keep the upper surface of the glass in its molten condition at this part, thus affording facilities for the cut-off portion of the moil to descend within the pool and become re-melted and re-mixed with the body of the molten glass within the furnace.

To prevent the flame from the upper surface of the furnace from impinging upon the upper surface w of the glass that is contained by the pool 3 at any time, the lower edge 2m of the monolith 2g is made to descend below the said upper surface of the glass, as is shown by Fig. 5.

The outer wall 2c, which, as is hereinbefore stated, forms the outer surface of the pools 3 and 5, is strengthened by bars or rails of metal 10 which may be bent to the desired shape for contact with the outer surface of said wall 2c (the contour of which is somewhat as is shown by Fig. 2), while extending vertically crosswise said bars 10 are supporting pillars 11 also of metal in order to retain said horizontal bars in their respective positions desired and prevent any inner pressure of the molten glass within the furnace from forcing said thinner part of the wall out of position.

It will be observed that the formation of the portion of the outer wall 2, as is hereinbefore explained, permits the formation of the pools 3 and 5 to extend so as to receive the full depth of molten glass to the very base of the furnace and to reach uninterruptedly to the gathering and cutting-off surfaces hereinbefore explained.

By this arrangement, on account of not in any way separating the full volume of glass with the volume within the pools stated, I may either have the floor of the furnace perfectly horizontal as in the old style, or I may have said floor 8 of the furnace somewhat inclined as is shown by Figs. 3, 4 and 6.

When using the floor of the furnace in its horizontal form I have found that the radiations of heat therefrom impinge upon the upper surface of the glass within the pools 3 and 5. However, whenever circumstances render it desirable I may arrange the floor to be of the inclined type stated, or I may have the inclined portions arranged annularly around the floor as is shown in broken lines Fig. 6.

These formations enable the rays of heat to be reflected from the inclined portions stated somewhat in the direction as indicated by the arrows 12, and by being thus directed the impinging of the rays upon the outer upper surfaces of the glass within the pools 3 and 5 keeps said glass at a desired higher temperature in order to permit the actions of gathering, cutting-off and re-melting which I wish to secure, and by the central partition 6 acting as a division between the pools 3 and 5 the portions of glass cut-off become re-melted in their descent and they are not found to move rearwardly so as to enter the pool 3, but on account of the actions of the whole volume of glass said portions which are being re-melted flow away and leave the gathering pool 3 entirely free thereof, while the surface of the glass at w in said pool 3 is more freely and efficiently acted upon by reason of all prior interruptions by the formations of supporting projections to secure the original style of gathering space used in former constructions.

Instead of forming the floor of the furnace of the inclined formation described I may have hollow or concave portions 14 of the floor opposite the positions where the pools 3 and 5 are situated so that the rays of heat reflected by the concavity in the floor may reflect and concentrate the rays of heat so as to impinge upon either the full depth of the metal within each pool or within the upper portions of same where the gathering and cutting-off actions take place when occasion for same may be found advantageous. Such being the nature and object of my said invention, what I claim is:

1. A glass melting furnace for use in connection with a suction gathering machine, consisting of a melting chamber having an arc-shaped pool exposed adjacent the forward confining wall thereof, a glass submerged partition located substantially intermediate the ends of said pool and an arc-shaped monolith supported on said partition and said wall and having its lower edge projecting downwardly below the normal level of glass within said chamber and said pool and constituting a confining wall for said pool, such pool being in open communication with said melting chamber throughout substantially the entire vertical extent of said chamber.

2. A glass melting furnace for use in connection with a suction gathering machine, consisting of a glass melting chamber having part of its floor inclined to the horizontal and with the deepest portion of said chamber located substantially adjacent the front wall thereof and having an arc-shaped pool exposed immediately adjacent such front wall, a glass submerged partition extending rearwardly from such front wall and dividing such pool into two substantially equal parts both in open communication with such chamber throughout substantially their entire vertical extent.

3. In a glass melting furnace for use in connection with a suction gathering machine, a glass melting chamber deepest adjacent the forward confining wall thereof and having an arc-shaped pool exposed adjacent such forward wall, a glass submerged partition dividing said pool into substantially equal parts and means projecting downwardly below the surface of the glass within said chamber and said pool for separating the surface of one such part from the surface of the main body of glass contained within such chamber.

4. In a glass melting furnace for use in connection with a glass gathering machine, a glass melting chamber having different depths and having at least one substantially vertical confining wall, which on its chamber side is provided with two contiguous exposed pool forming recesses each having a depth substantially equal to the depth of the deepest part of said chamber.

5. In a glass furnace for use in connection with a glass gathering machine, a melting chamber having different depths, with at least one of its confining walls located adjacent the deepest portion thereof and having contiguous pool defining recesses located therein and which extends from the glass level line of said chamber to the bottom of the chamber, and a floor for said chamber so constructed and arranged as to reflect heat waves from said chamber and concentrate the effect thereof at the surface of the glass within said pools.

6. In a glass furnace, a melting chamber having different depths in different portions thereof, a confining wall therefor located adjacent the deepest portion thereof and having a pool defining recess extending from the top to the bottom thereof and in open communication with said chamber throughout the entire vertical extent thereof, and means for reflecting heat waves from said chamber to the glass within said recess and concentrate the same adjacent the surface of such glass.

7. In a glass furnace for use in connection with a glass gathering machine, a chamber for containing molten glass, having different depths, and having its deepest portion located adjacent one of its confining walls, recesses in said wall defining two pools which are arranged side by side and extend from the normal glass level within said chamber to the chamber bottom, and a floor for said chamber adjacent said recesses and so constructed and arranged as to reflect heat waves from said chamber and concentrate their effect at the surface of the glass within such recesses.

8. In a glass melting furnace for use in connection with a glass gathering machine, a glass melting chamber having at least one substantially vertical confining wall and a floor inclined to the horizontal and with its lowest part adjacent such wall; the construction and arrangement being such that heat rays from the interior of the chamber are convergingly reflected by said floor toward the surface of the glass within said chamber at a point adjacent said wall.

WILLIAM BELL MITCHELL.